(12) United States Patent
Harris

(10) Patent No.: US 6,454,128 B1
(45) Date of Patent: Sep. 24, 2002

(54) HAND-HELD LIQUID CANDY DISPENSER

(75) Inventor: Jason A. Harris, San Rafael, CA (US)

(73) Assignee: Hasbro, Inc., Pawtucket, RI (US)

( * ) Notice: Subject to any disclaimer, the term of this patent is extended or adjusted under 35 U.S.C. 154(b) by 0 days.

(21) Appl. No.: 09/870,230

(22) Filed: May 30, 2001

(51) Int. Cl.[7] .................................................. B67D 3/18
(52) U.S. Cl. ....................................................... 222/78
(58) Field of Search ............................. 222/78, 402.15, 222/402.24

(56) References Cited

U.S. PATENT DOCUMENTS

| | | | |
|---|---|---|---|
| 594,595 A | * 11/1897 | Brethauer | 222/78 |
| 836,181 A | * 11/1906 | Cray | 222/78 |
| 1,534,208 A | * 4/1925 | Gibson | 222/78 |
| 1,558,930 A | * 10/1925 | Schuck | 222/78 |
| 1,885,180 A | * 11/1932 | Cameron | 222/78 |
| 2,121,185 A | 6/1938 | Claff | 99/138 |
| 2,517,027 A | 8/1950 | Rado | 222/94 |
| 3,353,749 A | * 11/1967 | Lahaug | 222/78 |
| 4,037,790 A | * 7/1977 | Reiser et al. | 222/78 |
| 4,061,249 A | 12/1977 | Smith | 222/78 |
| 4,630,756 A | 12/1986 | Amici et al. | 222/78 |
| 4,848,246 A | * 7/1989 | Rosen | 222/78 |
| 4,888,188 A | 12/1989 | Castner et al. | 426/109 |
| 5,324,527 A | 6/1994 | Coleman | 426/134 |
| RE35,577 E | 8/1997 | Coleman | 426/134 |

* cited by examiner

Primary Examiner—Lesley D. Morris
Assistant Examiner—Thach H. Bui
(74) Attorney, Agent, or Firm—Marshall, Gerstein & Borun.

(57) ABSTRACT

A liquid candy dispenser may include a liquid candy reservoir having an internal space formed therein that may contain liquid candy. The reservoir may be sized to fit within a person's hand, and the reservoir may have a liquid candy supply hole. A dispensing structure may have a dispensing hole formed therein and a retaining portion that allows the dispensing structure to be placed and retained on the person's finger. The supply hole and the dispensing hole may be fluidly coupled so that, when the reservoir is squeezed by the person, a portion of liquid candy may be forced from the reservoir through the dispensing hole so that the portion of liquid candy may be tasted by the person.

15 Claims, 1 Drawing Sheet

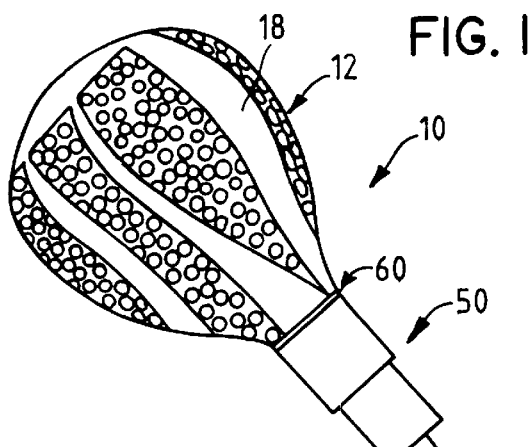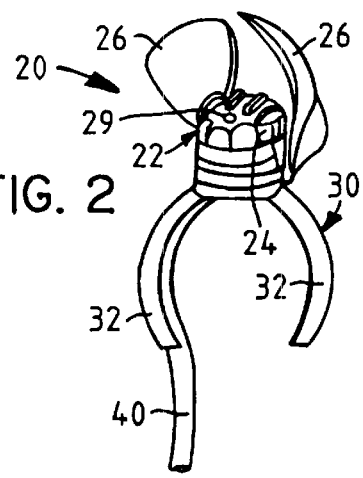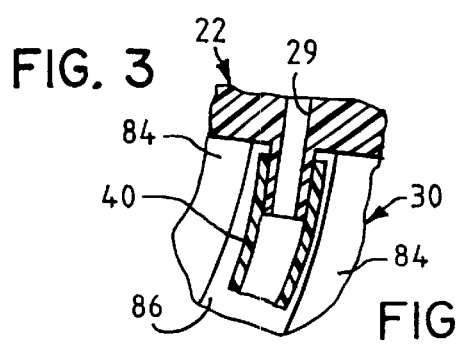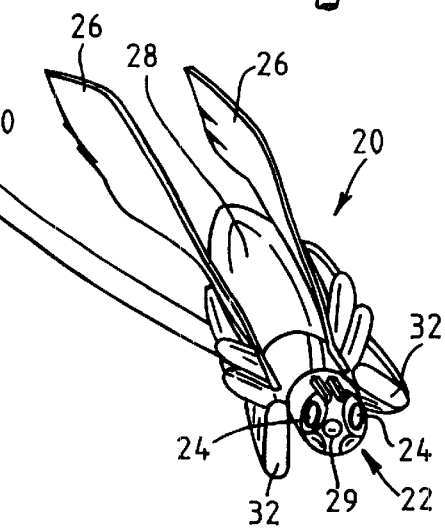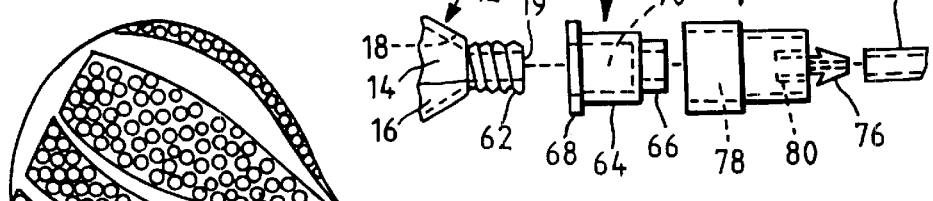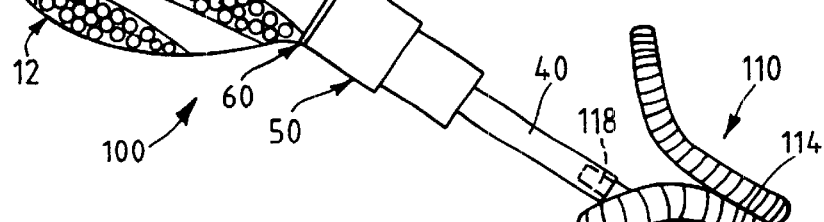

HAND-HELD LIQUID CANDY DISPENSER

BACKGROUND OF THE INVENTION

The present invention is directed to a hand-held liquid candy dispenser for dispensing liquid candy from a reservoir.

Various types of dispensers for dispensing liquids have been previously proposed. For example, U.S. Pat. No. 4,061,249 to Smith discloses a ring dispenser adapted to be worn on a person's finger. The ring dispenser has an internal reservoir that is filled with a pressurized irritant intended to be used for self-defense purposes and a flower-shaped portion having a spray hole formed therein. The irritant, which is disclosed as an aerosol, is sprayed from the reservoir through the spray hole to ward off would-be attackers.

U.S. Pat. No. 5,324,527 to Coleman discloses an candy item having a lollipop and a dispensing assembly for dispensing liquid candy through the candy portion of the lollipop. The dispensing assembly includes a liquid candy reservoir, a hollow tube that supports the candy portion of the lollipop and that fluidly interconnects the liquid candy reservoir to the candy portion of the lollipop, and a pumping mechanism for forcing liquid candy through the hollow tube and through one or more passageways formed in the candy portion of the lollipop.

SUMMARY OF THE INVENTION

The present invention is directed to a hand-held liquid candy dispenser. The candy dispenser may include a liquid candy reservoir having an internal space formed therein that is capable of containing a volume of liquid candy. The liquid candy reservoir may be sized to fit within a person's hand, and the liquid candy reservoir may have a liquid candy supply hole. The liquid candy dispensing structure may have a liquid candy dispensing hole formed therein and a retaining portion that is designed to allow the liquid candy dispensing structure to be placed and retained on the person's finger.

The candy dispenser may also include a flexible supply tube having a hollow interior portion that fluidly interconnects the liquid candy reservoir with the liquid candy dispensing structure. The supply tube may have a length that allows the liquid candy reservoir to be disposed in the person's hand when the liquid candy dispensing structure is disposed on the person's finger. The hollow interior portion of the flexible supply tube may be fluidly coupled between the liquid candy supply hole of the liquid candy reservoir and the liquid candy dispensing hole of the liquid candy dispensing structure so that, when the liquid candy dispensing structure is disposed on the person's finger, when the internal space of the liquid candy reservoir has liquid candy disposed therein, and when the liquid candy reservoir is disposed in the person's hand and squeezed by the person, a portion of liquid candy will be forced from the internal space within the liquid candy reservoir through the liquid candy dispensing hole formed in the liquid candy dispensing structure so that the portion of liquid candy may be tasted by the person.

The liquid candy dispensing structure may be shaped like a bug or like an earthworm. If the dispensing structure is shaped like a bug, the retaining portion of the liquid candy dispensing structure may comprise a plurality of bug legs. If the dispensing structure is shaped like an earthworm, the retaining portion of the liquid candy dispensing structure may be shaped like a portion of an earthworm.

The retaining portion of the liquid candy dispensing structure may be provided with an interior side that is disposed adjacent a person's finger when the liquid candy dispensing structure is disposed on the person's finger. The interior side of the retaining portion may have a channel formed therein, and the channel may have a depth that allows the channel to at least partly accommodate a portion of the flexible supply tube so that, when the portion of the flexible supply tube is disposed in the channel, the channel facilitates placement of the liquid candy dispensing structure on the person's finger.

The candy dispenser may also include one or more connecting members disposed between the liquid candy reservoir and a first end of the flexible supply tube, each of the connecting members having a hole through which the portion of liquid candy flows after the portion of liquid candy passes through the liquid candy supply hole and before the portion of liquid candy passes into the hollow interior portion of the flexible supply tube.

The features and advantages of the present invention will be apparent to those of ordinary skill in the art in view of the detailed description of various embodiments, which is made with reference to the drawings, a brief description of which is provided below.

BRIEF DESCRIPTION OF THE DRAWINGS

FIG. 1 is a perspective view of one embodiment of a hand-held liquid candy dispenser in accordance with the invention;

FIG. 2 is a side view of a portion of the candy dispenser of FIG. 1;

FIG. 3 is a cross-sectional view of a portion of the candy dispenser of FIG. 1;

FIG. 4 is a perspective view of another embodiment of a hand-held liquid candy dispenser in accordance with the invention; and FIG. 5 is an exploded perspective view of a portion of a candy dispenser in accordance with the invention.

DETAILED DESCRIPTION OF VARIOUS EMBODIMENTS

FIG. 1 is a perspective view of a first embodiment of a hand-held liquid candy dispenser 10 in accordance with the invention. Referring to FIGS. 1 and 5, the candy dispenser 10 may have a liquid candy reservoir 12 with a bulbous shape and an internal space 14 formed therein in which a volume of liquid candy 16 may be disposed. The candy reservoir 12 may be provided with a flexible wall or walls 18, which may be composed entirely of a flexible material, such as flexible plastic or rubber, to allow the reservoir 12 to be elastically deformed or squeezed by a person when held in the person's hand. The candy reservoir 12 may be provided with a liquid candy dispensing passageway or hole 19.

The candy reservoir 12 may be hand-held and sized so as to fit within a person's hand, such as within the palm of a person's hand, so that the liquid candy reservoir 12 may be disposed adjacent the palm of the person's hand and so that the candy reservoir 12 may be retained in the person's hand by gripping portions of the reservoir 12 with the person's fingers. For example, the candy reservoir 12 may be provided with a length of about two inches or a length within a range of between about 1½ and 2½ inches, and the candy reservoir 12 may be provided with a diameter of about 1½ inches or a diameter in a range of about one inch to about two inches.

Referring to FIGS. 1 and 2, the candy dispenser 10 may be provided with a candy dispensing structure 20, which may be shaped in various manners, such as like an insect or bug. If shaped like a bug, the candy dispensing structure 20 may be provided with a bug head 22, a pair of bug eyes 24, a pair of bug wings 26 and a bug body or thorax 28. The candy dispensing structure 20 may be provided with a candy dispensing hole 29 through which liquid candy may be dispensed.

The candy dispensing structure 20 may be provided with a retaining portion or structure 30 to allow the candy dispensing structure 20 to be retained on the finger of a person. The retaining structure 30 may comprise a portion of the candy dispensing structure 20 that has a curved or other shape that wraps at least partly around a person's finger so that when a person's finger is disposed through the retaining structure 30, the retaining structure 30 allows the candy dispensing structure 20 to be retained on the person's finger by at least partially encircling or enclosing the person's finger. The retaining structure 30 may have a generally circular shaped portion having an internal diameter substantially equal to the diameter of a person's finger. For example, the retaining structure 30 may have an internal diameter of about one-half of an inch or three-quarters of an inch. Where the candy dispensing structure 20 is shaped like a bug, the retaining structure 30 may be provided in the form of a plurality of bug legs 32 that at least partially surround a person's finger when the candy dispensing structure 20 is placed on the person's finger.

The candy dispenser 10 may also be provided with a flexible supply tube 40, which may have a hollow interior portion and which may be composed of a flexible, clear plastic material. The supply tube may fluidly interconnect the candy reservoir 12 with the liquid candy dispensing structure 20, and the supply tube 40 may be provided with a length and/or a diameter that allows the liquid candy reservoir 12 to be disposed in a person's hand when the liquid candy dispensing structure 20 is disposed on the person's finger The hollow interior portion of the supply tube 40 may be fluidly coupled between the liquid candy supply hole 19 (FIG. 5) of the candy reservoir 12 and the dispensing hole 29 of the dispensing structure 20 so that, when the dispensing structure 20 is disposed on the person's finger and when the candy reservoir 12 is disposed in the person's hand and squeezed by the person, a portion of liquid candy 16 will be forced from the internal space within the candy reservoir 12, through the supply hole 19, through the hollow interior portion of the supply tube 40, and through the candy dispensing hole 29 formed in the dispensing structure 20 so that the portion of liquid candy 16 may be tasted by the person.

Referring to FIG. 5, the candy dispenser 10 may be provided with one or more connecting members 50, 60 that fluidly interconnect the candy reservoir 12 with the supply tube 40. The candy reservoir 12 may be provided with a threaded portion 62, and the connecting member 60 may be provided with an internally threaded portion so that the connecting member 60 may be threadably coupled to the threaded portion 62 of the candy reservoir 12. The connecting member 60 may have one or more sections 64, 66 having an outer diameter or a plurality of different outer diameters that allow the sections 64, 66 to be telescopically inserted (see FIG. 1) or disposed in an interior space formed in the connecting member 50. The connecting member 60 may be provided with a collar portion 68 having a diameter that is larger than the diameter(s) of the sections 64, 66. The connecting member 60 may be press fit into, adhesively connected to, or otherwise connected to, the connecting member 50. The connecting member 60 may have one or more internal apertures 70 formed therein.

The connecting member 50 may be provided with a hollow connecting tube 76 that is sized to be tightly inserted into the hollow interior portion of the supply tube 40. One or more barbs or retaining members may be formed on the outer surface of the connecting tube 76 so that the supply tube 40 is tightly retained on the connecting tube 76. The interior of the connecting member 50 may be provided with one or more apertures 78 and an internal tube 80 that is in fluid communication with the internal hollow portion of the connecting tube 76.

When the candy dispenser 10 includes one of the connecting members 50, 60 and when the candy reservoir 12 is squeezed, liquid candy 16 will flow through one of the apertures or holes formed in the one connecting member 50 or 60 after the liquid candy passes thorough the supply hole 19 formed in the candy reservoir 12 and before the liquid candy passes into the hollow interior portion of the supply tube 40.

When the candy dispenser 10 includes both of the connecting members 50, 60 and when the candy reservoir 12 is squeezed, liquid candy 16 will flow through one of the apertures or holes formed in each of the connecting members 50, 60 after the liquid candy passes through the supply hole 19 formed in the candy reservoir 12 and before the liquid candy passes into the hollow interior portion of the supply tube 40.

Referring to FIG. 3, which is a cross-sectional view of a portion of the candy dispenser 10, the retaining portion 30 of the dispensing structure 20 may be provided with an interior side 84 that has a recess or channel 86 formed therein. The channel 86 may be provided with a depth that allows the channel 86 to at least partly accommodate a portion of the supply tube 40 (see also FIG. 2) so that, when the portion of the supply tube 40 is disposed in the channel 86, the channel 86 facilitates placement of the dispensing structure 20 on the person's finger.

FIG. 4 is a perspective view of another embodiment of a hand-held liquid candy dispenser 100 in accordance with the invention. Referring to FIG. 4, the candy dispenser 100 may be provided with a number of the same components described above in connection with the embodiment of FIG. 1. In particular, the candy dispenser 100 may include the candy reservoir 12, the connecting member 50, the connecting member 60, the flexible supply tube 40, and all modifications described above. The only significant difference between the embodiment of FIG. 1 and the embodiment of FIG. 4 may be that the embodiment of FIG. 4 may utilize a different candy dispensing structure 110.

Referring to FIG. 4, the candy dispensing structure 110 may be shaped like an earthworm. In particular, the dispensing structure 110 may have a plurality of earthworm coils 112 which are formed in a circle or ring so that the coils 112 would completely encircle a person's finger when the dispensing structure 110 was placed on the person's finger. It should be appreciated that the earthworm coils 112 may act as a retention portion that helps retain the dispensing structure 110 on a person's finger.

The dispensing structure 110 may include a hollow dispensing tube 114, which may be a relatively straight section of tube, having a first end with a liquid candy dispensing aperture 116 formed therein and a second end 118 that is fluidly coupled to the flexible supply tube 40. The operation of the embodiment of FIG. 4 may be identical to that of the embodiment of FIG. 1 described above. When the candy reservoir 12 of the dispenser 100 is squeezed, liquid candy may be dispensed from the reservoir 12, through the supply tube 40, and out the dispensing hole 116 formed in the dispensing structure 110.

Numerous additional modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A hand-held liquid candy dispenser, comprising:

a liquid candy reservoir having an internal space formed therein, said liquid candy reservoir having a volume of liquid candy disposed in said internal space, said liquid candy reservoir being sized to fit within a person's hand, said liquid candy reservoir having a liquid candy supply hole; and a liquid candy dispensing structure having a liquid candy dispensing hole formed therein, said liquid candy dispensing structure having a retaining portion that is shaped to accommodate a person's finger so that said liquid candy dispensing structure may be placed on the person's finger, said retaining portion of said liquid candy dispensing structure allowing said liquid candy dispensing structure to be retained on the person's finger, said liquid candy dispensing structure is shaped like a bug, and said liquid candy supply hole of said liquid candy reservoir being fluidly coupled to said liquid candy dispensing hole of said liquid candy dispensing structure so that, when said liquid candy dispensing structure is disposed on the person's finger and when said liquid candy reservoir is disposed in the person's hand and squeezed by the person, a portion of liquid candy will be forced from said internal space within said liquid candy reservoir, through said liquid candy supply hole, and through said liquid candy dispensing hole formed in said liquid candy dispensing structure so that said portion of liquid candy may be tasted by the person.

2. A candy dispenser as defined in claim 1 wherein said retaining portion of said liquid candy dispensing structure comprises a plurality of bug legs.

3. A dispenser as defined in claim 1, additionally comprising a fluid supply member connected to fluidly couple said liquid candy supply hole of said liquid candy reservoir to said liquid candy dispensing hole of said liquid candy dispensing structure.

4. A candy dispenser as defined in claim 1 additionally comprising a flexible supply tube connected to fluidly couple said liquid candy supply hole of said liquid candy reservoir to said liquid candy dispensing hole of said liquid candy dispensing structure.

5. A hand-held liquid candy dispenser, comprising:

a liquid candy reservoir having an internal space formed therein, said liquid candy reservoir having a volume of liquid candy disposed in said internal space, said liquid candy reservoir being sized to fit within a person's hand, said liquid candy reservoir having a liquid candy supply hole; and a liquid candy dispensing structure having a liquid candy dispensing hole formed therein, said liquid candy dispensing structure having a retaining portion that is shaped to accommodate a person's finger so that said liquid candy dispensing structure may be placed on the person's finger, said retaining portion of said liquid candy dispensing structure allowing said liquid candy dispensing structure to be retained on the person's finger, said liquid candy dispensing structure is shaped like an earthworm, and said liquid candy supply hole of said liquid candy reservoir being fluidly coupled to said liquid candy dispensing hole of said liquid candy dispensing structure so that, when said liquid candy dispensing structure is disposed on the person's finger and when said liquid candy reservoir is disposed in the person's hand and squeezed by the person, a portion of liquid candy will be forced from said internal space within said liquid candy reservoir, through said liquid candy supply hole, and through said liquid candy dispensing hole formed in said liquid candy dispensing structure so that said portion of liquid candy may be tasted by the person.

6. A candy dispenser as defined in claim 5 wherein said retaining portion of said liquid candy dispensing structure is shaped like a portion of an earthworm.

7. A candy dispenser as defined in claim 5 additionally comprising a fluid supply member connected to fluidly couple said liquid candy supply hole of said liquid candy reservoir to said liquid candy dispensing hole of said liquid candy dispensing structure.

8. A candy dispenser as defined in claim 5 additionally comprising a flexible supply tube connected to fluidly couple said liquid candy supply hole of said liquid candy reservoir to said liquid candy dispensing hole of said liquid candy dispensing structure.

9. A hand-held liquid candy dispenser, comprising:

a liquid candy, reservoir having an internal space formed therein, said liquid candy reservoir having a volume of liquid candy disposed in said internal space, said liquid candy reservoir being sized to fit within a person's hand, said liquid candy reservoir having a liquid candy supply hole; and a liquid candy dispensing structure having a liquid candy dispensing hole formed therein, said liquid candy dispensing structure is shaped like a creature, said liquid candy dispensing structure comprising a portion shaped like a creature's head and comprising a pair of eyes, and said liquid candy supply hole of said liquid candy reservoir being fluidly coupled to said liquid candy dispensing hole of said liquid candy dispensing structure so that, when said liquid candy reservoir is disposed in the person's hand and squeezed by the person, a portion of liquid candy will be forced from said internal space within said liquid candy reservoir, through said liquid candy supply hole, and through said liquid candy dispensing hole formed in said liquid candy dispensing structure so that said portion of liquid candy may be tasted by the person.

10. A hand-held liquid candy dispenser, comprising:

a liquid candy reservoir having an internal space formed therein, said liquid candy reservoir having a volume of liquid candy disposed in said internal space, said liquid candy reservoir being sized to fit within a person's hand, said liquid candy reservoir having a liquid candy supply hole;

a liquid candy dispensing structure having a liquid candy dispensing hole formed therein, said liquid candy dispensing structure having a retaining portion that is shaped to accommodate a person's finger so that said liquid candy dispensing structure may be placed on the person's finger, said retaining portion of said liquid candy dispensing structure being shaped so as to wrap at least partly around the person's finger so that said liquid candy dispensing structure may be retained on the person's finger; and a flexible supply tube having a hollow interior portion that fluidly interconnects said liquid candy reservoir with said liquid candy dispensing structure, said flexible supply tube having a length that allows said liquid candy reservoir to be disposed in the person's hand when said liquid candy dispensing structure is disposed on the person's finger, said hollow interior portion of said flexible supply tube being fluidly coupled between said liquid candy supply hole of said liquid candy reservoir and said liquid candy dispensing hole of said liquid candy dispensing structure so that, when said liquid candy dispensing structure is disposed on the person's finger and when said liquid candy reservoir is disposed in the person's hand and squeezed by the person, a portion of liquid candy will be forced from said internal space within said liquid candy reservoir, through said liquid candy supply hole, through said hollow interior portion of said flexible supply tube, and through said liquid candy dispensing hole formed in said liquid candy dispensing structure so that said portion of liquid candy may be tasted by the person, wherein said retaining portion of said liquid candy dispensing structure has an interior side that is disposed adjacent the person's finger when said liquid candy dispensing structure is disposed on the person's finger, wherein said interior side of said retaining portion of said liquid candy dispensing structure has a channel formed therein, and wherein said channel has a depth that allows said channel to at least partly accommodate a portion of said flexible supply tube so that, when said portion of said flexible supply tube is disposed in said channel, said channel facilitates placement of said liquid candy dispensing structure on the person's finger.

11. A hand-held liquid candy dispenser, comprising:

a liquid candy reservoir having an internal space formed therein, said liquid candy reservoir having a volume of liquid candy disposed in said internal space, said liquid candy reservoir being sized to fit within a person's hand, said liquid candy reservoir having a liquid candy supply hole;

a liquid candy dispensing structure having a liquid candy dispensing hole formed therein, said liquid candy dispensing structure having a retaining portion that is shaped to accommodate a person's finger so that said liquid candy dispensing structure may be placed on the person's finger, said retaining portion of said liquid candy dispensing structure allowing said liquid candy dispensing structure to be retained on the person's finger; and a flexible supply tube having a hollow interior portion that fluidly interconnects said liquid candy reservoir with said liquid candy dispensing structure, said flexible supply tube having a length that allows said liquid candy reservoir to be disposed in the person's hand when said liquid candy dispensing structure is disposed on the person's finger, said hollow interior portion of said flexible supply tube being fluidly coupled between said liquid candy supply hole of said liquid candy reservoir and said liquid candy dispensing hole of said liquid candy dispensing structure so that, when said liquid candy dispensing structure is disposed on the person's finger and when said liquid candy reservoir is disposed in the person's hand and squeezed by the person, a portion of liquid candy will be forced from said internal space within said liquid candy reservoir, through said liquid candy supply hole, through said hollow interior portion of said flexible supply tube, and through said liquid candy dispensing hole formed in said liquid candy dispensing structure so that said portion of liquid candy may be tasted by the person, wherein said liquid candy dispensing structure is shaped like a bug and wherein said retaining portion of said liquid candy dispensing structure comprises a plurality of bug legs.

12. A hand-held liquid candy dispenser, comprising:

a liquid candy reservoir having an internal space formed therein, said liquid candy reservoir having a volume of liquid candy disposed in said internal space, said liquid candy reservoir being sized to fit within a person's hand, said liquid candy reservoir having a liquid candy supply hole;

a liquid candy dispensing structure having a liquid candy dispensing hole formed therein, said liquid candy dispensing structure having a retaining portion that is shaped to accommodate a person's finger so that said liquid candy dispensing structure may be placed on the person's finger, said retaining portion of said liquid candy dispensing structure allowing said liquid candy dispensing structure to be retained on the person's finger; and a flexible supply tube having a hollow interior portion that fluidly interconnects said liquid candy reservoir with said liquid candy dispensing structure, said flexible supply tube having a length that allows said liquid candy reservoir to be disposed in the person's hand when said liquid candy dispensing structure is disposed on the person's finger, said hollow interior portion of said flexible supply tube being fluidly coupled between said liquid candy supply hole of said liquid candy reservoir and said liquid candy dispensing hole of said liquid candy dispensing structure so that, when said liquid candy dispensing structure is disposed on the person's finger and when said liquid candy reservoir is disposed in the person's hand and squeezed by the person, a portion of liquid candy will be forced from said internal space within said liquid candy reservoir, through said liquid candy supply hole, through said hollow interior portion of said flexible supply tube, and through said liquid candy dispensing hole formed in said liquid candy dispensing structure so that said portion of liquid candy may be tasted by the person, wherein said retaining portion of said liquid candy dispensing structure has an interior side that is disposed adjacent the person's finger when said liquid candy dispensing structure is disposed on the person's finger, wherein said interior side of said retaining portion of said liquid candy dispensing structure has a channel formed therein, and wherein said channel has a depth that allows said channel to at least partly accommodate a portion of said flexible supply tube so that, when said portion of said flexible supply tube is disposed in said channel, said channel facilitates placement of said liquid candy dispensing structure on the person's finger.

13. A hand-held liquid candy dispenser, comprising:

a liquid candy reservoir having an internal space formed therein, said liquid candy reservoir being capable of containing a volume of liquid candy in said internal space, said liquid candy reservoir being sized to fit within a person's hand, said liquid candy reservoir having a liquid candy supply hole;

a liquid candy dispensing structure having a liquid candy dispensing hole formed therein, said liquid candy dispensing structure having a retaining portion that allows said liquid candy dispensing structure to be placed and retained on the person's finger;

a flexible supply tube having a hollow interior portion that fluidly interconnects said liquid candy reservoir with said liquid candy dispensing structure, said flexible supply tube having a length that allows said liquid candy reservoir to be disposed in the person's hand when said liquid candy dispensing structure is disposed on the person's finger, said hollow interior portion of said flexible supply tube being fluidly coupled between said liquid candy supply hole of said liquid candy reservoir and said liquid candy dispensing hole of said liquid candy dispensing structure so that, when said liquid candy dispensing structure is disposed on the person's finger, when said internal space of said liquid candy reservoir has liquid candy disposed therein, and when said liquid candy reservoir is disposed in the person's hand and squeezed by the person, a portion of liquid candy will be forced from said internal space within said liquid candy reservoir through said liquid candy dispensing hole formed in said liquid candy dispensing structure so that said portion of liquid candy may be tasted by the person; and a connecting member disposed between said liquid candy reservoir and a first end of said flexible supply tube, said connecting member having a hole through which said portion of liquid candy flows after said portion of liquid candy passes through said liquid candy supply hole and before said portion of liquid candy passes into said hollow interior portion of said flexible supply tube.

14. A hand-held liquid candy dispenser, comprising:

a liquid candy reservoir having an internal space formed therein, said liquid candy reservoir being capable of containing a volume of liquid candy in said internal space, said liquid candy reservoir being sized to fit within a person's hand, said liquid candy reservoir having a liquid candy supply hole;

a liquid candy dispensing structure having a liquid candy dispensing hole formed therein, said liquid candy dispensing structure having a retaining portion that allows said liquid candy dispensing structure to be placed and retained on the person's finger;

a flexible supply tube having a hollow interior portion that fluidly interconnects said liquid candy reservoir with said liquid candy dispensing structure, said flexible supply tube having a length that allows said liquid candy reservoir to be disposed in the person's hand when said liquid candy dispensing structure is disposed on the person's finger, said hollow interior portion of said flexible supply tube being fluidly coupled between said liquid candy supply hole of said liquid candy reservoir and said liquid candy dispensing hole of said liquid candy dispensing structure so that, when said liquid candy dispensing structure is disposed on the person's finger, when said internal space of said liquid candy reservoir has liquid candy disposed therein, and when said liquid candy reservoir is disposed in the person's hand and squeezed by the person, a portion of liquid candy will be forced from said internal space within said liquid candy reservoir through said liquid candy dispensing hole formed in said liquid candy dispensing structure so that said portion of liquid candy may be tasted by the person;

a first connecting member disposed between said liquid candy reservoir and a first end of said flexible supply tube, said first connecting member having a hole through which said portion of liquid candy flows after said portion of liquid candy passes through said liquid candy supply hole and before said portion of liquid candy passes into said hollow interior portion of said flexible supply tube; and a second connecting member disposed between said liquid candy reservoir and a first end of said flexible supply tube, said second connecting member having a hole through which said portion of liquid candy flows after said portion of liquid candy passes through said liquid candy supply hole and before said portion of liquid candy passes into said hollow interior portion of said flexible supply tube.

15. A hand held liquid candy dispenser, comprising:

a liquid candy reservoir having an internal space formed therein, said liquid candy reservoir being capable of containing a volume of liquid candy in said internal space, said liquid candy reservoir being sized to fit within a person's hand, said liquid candy reservoir having a liquid candy supply hole;

a liquid candy dispensing structure having a liquid candy dispensing hole formed therein, said liquid candy dispensing structure having a retaining portion that allows said liquid candy dispensing structure to be placed and retained on the person's finger; and a flexible supply tube having a hollow interior portion that fluidly interconnects said liquid candy reservoir with said liquid candy dispensing structure, said flexible supply tube having a length that allows said liquid candy reservoir to be disposed in the person's hand when said liquid candy dispensing structure is disposed on the person's finger, said hollow interior portion of said flexible supply tube being fluidly coupled between said liquid candy supply hole of said liquid candy reservoir and said liquid candy dispensing hole of said liquid candy dispensing structure so that, when said liquid candy dispensing structure is disposed on the person's finger, when said internal space of said liquid candy reservoir has liquid candy disposed therein, and when said liquid candy reservoir is disposed in the person's hand and squeezed by the person, a portion of liquid candy will be forced from said internal space within said liquid candy reservoir through said liquid candy dispensing hole formed in said liquid candy dispensing structure so that said portion of liquid candy may be tasted by the person, wherein said retaining portion of said liquid candy dispensing structure has an interior side that is disposed adjacent the person's finger when said liquid candy dispensing structure is disposed on the person's finger, wherein said interior side of said retaining portion of said liquid candy dispensing structure has a channel formed therein, and wherein said channel has a depth that allows said channel to at least partly accommodate a portion of said flexible supply tube so that, when said portion of said flexible supply tube is disposed in said channel, said channel facilitates placement of said liquid candy dispensing structure on the person's finger.

* * * * *